(12) United States Patent  (10) Patent No.: US 7,446,502 B2
Tong  (45) Date of Patent: Nov. 4, 2008

(54) BATTERY CHARGER FOR BATTERIES OF DIFFERENT TYPES

(75) Inventor: Gabriel Yui Lung Tong, Kowloon (HK)

(73) Assignee: Totex Design Limited (HK)

( * ) Notice: Subject to any disclaimer, the term of this patent is extended or adjusted under 35 U.S.C. 154(b) by 57 days.

(21) Appl. No.: 11/126,787

(22) Filed: May 11, 2005

(65) Prior Publication Data

US 2006/0255763 A1  Nov. 16, 2006

(51) Int. Cl.
*H02J 7/00* (2006.01)
(52) U.S. Cl. .............................. 320/110; 320/113
(58) Field of Classification Search ................ 320/110, 320/112–115
See application file for complete search history.

(56) References Cited

U.S. PATENT DOCUMENTS 5,256,954 A * 10/1993 Chen .......................... 320/110
5,287,052 A *  2/1994 Wang ......................... 320/110

* cited by examiner

*Primary Examiner*—Akm E Ullah
*Assistant Examiner*—Ramy Ramadan
(74) *Attorney, Agent, or Firm*—Renner, Kenner, Greive, Bobak, Taylor & Weber

(57) ABSTRACT

A battery charger for charging batteries of different types, the charger comprising: a seat for receiving a battery; first and second electrical contacts, the first and second contacts independently movable relative to the seat. The charger further includes a back stop moveable relative to the seat for contacting the opposite side of the battery from the electrical contacts, and current supply means to supply current via the electrical contacts to the battery to charge the battery. The battery to be charged is sandwiched between the back stop and the electrical contacts with the back stop moved to secure the battery in engagement with the electrical contacts and the electrical contacts moved into alignment with terminals of the battery.

16 Claims, 2 Drawing Sheets

BATTERY CHARGER FOR BATTERIES OF DIFFERENT TYPES

BACKGROUND ART

The present invention relates to a battery charger, which can be adapted to charge batteries and battery packs of different sizes and types.

Lithium-ion batteries and battery packs are generally cuboid in shape, and are made in a variety of sizes and types. Their electrical terminals can be located at different locations depending on their type. This often requires a dedicated charger to charge each different type of battery or battery pack.

It is known in the art for battery chargers to be adjustable to charge batteries of different sizes. In particular, U.S. Pat. No. 5,357,185 describes a battery charger in which the battery is held firmly in place on a mounting seat. The battery pack is held in position using sucking discs, a buckle belt, a vertically moveable retaining block or a magnet. When the battery is secured by one of these means, the contacts slide to contact the terminals of the battery, in order to recharge the battery.

The described battery charger has the disadvantage that it can only receive batteries or battery packs lying flat, that is with their largest surface lying on the mounting seat. This makes it difficult to adapt the battery charger to receive batteries which have their terminals on their largest surface, since the terminals will be facing downwardly onto the seat.

DISCLOSURE OF THE INVENTION

The object of the present invention is to provide a battery charger which can easily charge different types and sizes of batteries and battery packs.

The present invention is of particular use for charging lithium-ion batteries and battery packs. Such batteries and battery packs are widely used in digital cameras, camcorders, cellular phones and many other portable appliances. Such batteries and packs are generally 3.6V or 7.2V.

BEST MODE FOR CARRYING OUT THE INVENTION

Figure 2:
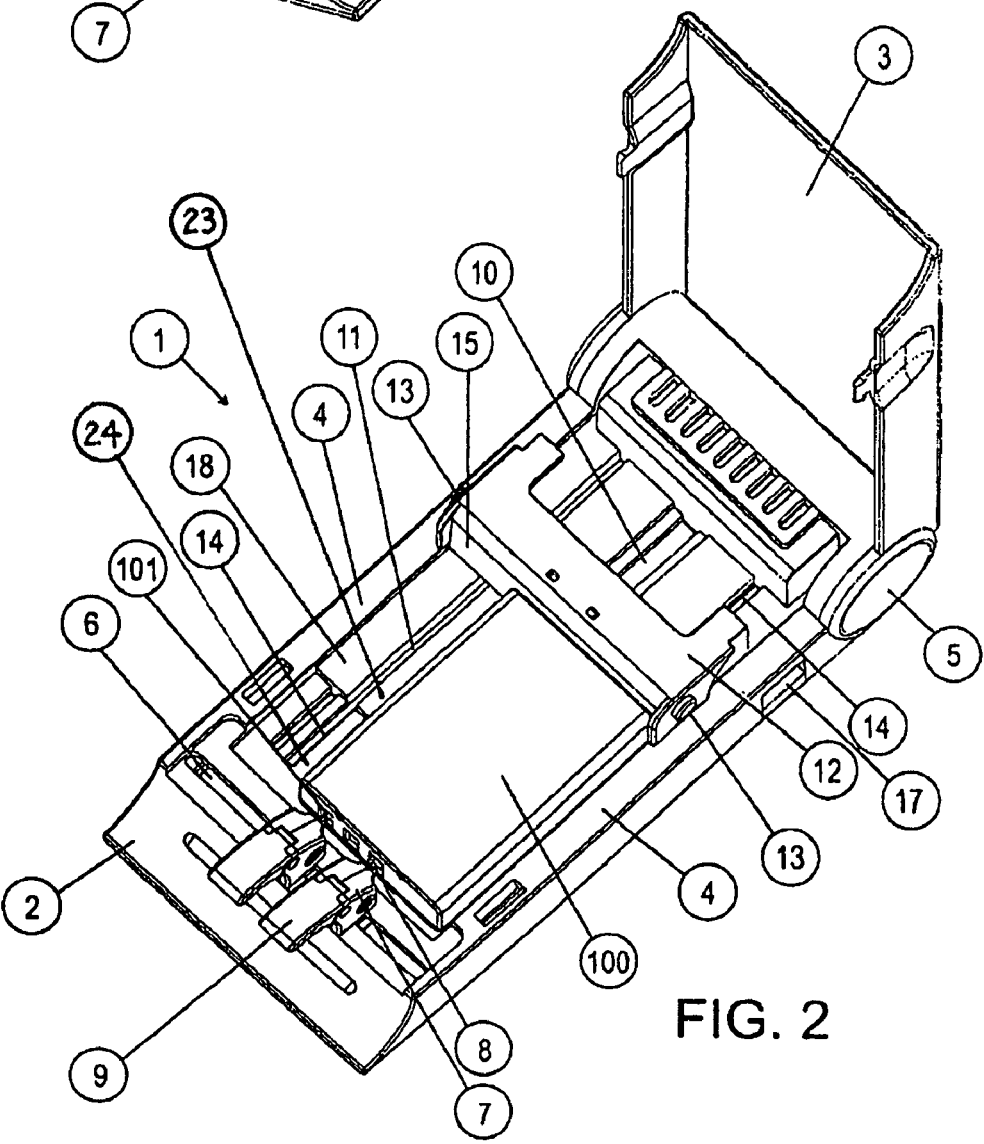
FIG. 2 is a perspective view from a second angle of the battery charger of the present invention with a second type of battery.

With reference to FIG. 2, the present invention provides a battery charger 1 comprising a body 2 which has a battery seat 18 for receiving a battery. The battery seat 18 is a substantially planar area on the top surface of the body, large enough to receive many different sizes of battery. Battery seat 18 includes two platforms 23, 24, which are positioned at different levels as shown in FIG. 2. Upstanding walls 4 in the form of flanges extend along both the long edges of the seat 18. At a rear end of the body 2, a cover 3 is rotatably attached to the body 2 by means of a hinge 5.

At the front end of the battery charger 1, a transverse slot 6 is provided in the body 2, the slot 6 extending across substantially the whole width of the body 2. Two contact blocks 7 are slidable in the slot 6. Each contact block 7 is provided with a charger contact 8 on a rear facing side of the contact block 7. When a battery 100 is located on the battery seat 18, the two charger contacts 8 can be aligned with and engage terminals 101 of the battery 100. Each contact block 7 is also provided with a locking lever 9, the locking lever 9 rotatably connected to the contact block 7. The locking lever 9 is moveable between a first, lowered, position and a second, raised, position. In the first position the locking lever 9 prevents the contact blocks 7 from sliding in the slot 6. In the second position, the locking lever 9 allows the contact blocks 7 to slide freely along in the transverse slot 6.

The body 2 is further provided with a longitudinally extending guidance slot 10 extending along the length of the seat 18, the guidance slot 10 extending substantially the whole length of the seat 18. Two locking slots 11 also extend axially along the seat 18, extending substantially the whole length of the seat 18. The guidance slot 10 is located along the center line of the body 2. The locking slots 11 extend to either side of the guidance slot 10, and are equally spaced from the guidance slot 10. Along the whole length of each locking slot 11, facing away from the center line of the body 2, are toothlike or serrated restraint surfaces 14.

A back stop 12 is slidably located in the guidance slot 10, so that the back stop 12 is slidable along substantially the whole length of the seat 18. The back stop 12 is provided with an upstanding flange 15 at the forward edge of the back stop 12. The flange 15 can be slid to securely engage a surface of the battery 100. The back stop 12 is located in the guidance slot 10 so that the back stop 12 is held extending transversely across the width of the seat 18, even while the back stop 12 is sliding.

Figure 3:
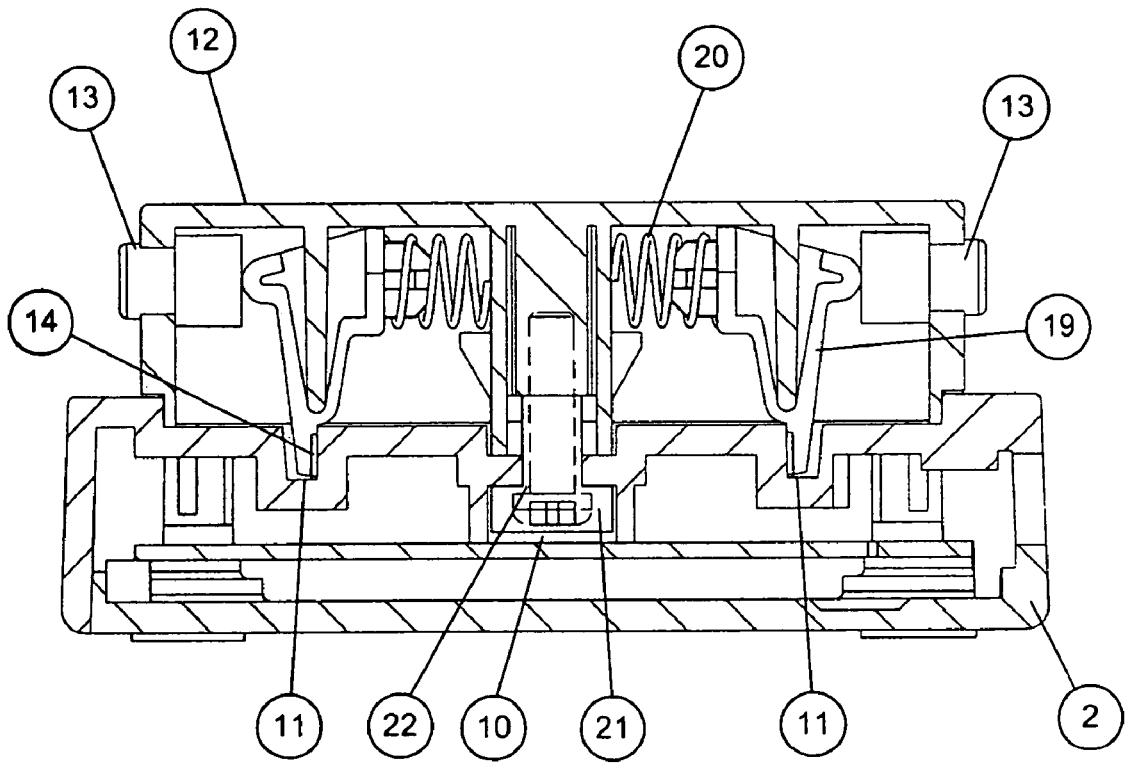
FIG. 3 is a cross-sectional view through the battery charger of the present invention.

With reference to FIG. 3, the back stop 12 is held in the guidance slot 10 by means of a guide member 21. The guide member 21 has the shape of an inverted-T. The guidance slot 10 has an opening 22 which is narrower than the rest of the slot. The opening 22 is narrower than the largest width of the guide. member 21, so the guide member 21 is securely held in the guidance slot 10.

The back stop 12 is provided with two locking buttons 13. Each locking button 13 contacts a locking arm 19. The locking arm 19 extends through the back stop 12 into a locking slot 11.

Resilient springs 20 are disposed inside the back stop 12. The resilient springs 20 bias the lower parts of the locking arms 19 against the restraint surfaces 14, such that the locking arms 19 are selectively engageable with the restraint surfaces 14. The locking arms 19 are rotatable within the back stop 12 between a position in which the locking arm 19 contacts the restraint surface 14, and when the locking button 13 is depressed, into a position in which the locking arm 19 does not contact the restraint surface 14.

The back stop 12 can thus be locked in place in various positions along the length of the guidance slot 10. When the two locking buttons 13 are pressed together, for example by the fingers of a user, the lower parts of the locking arms 19 disengage from the restraint surfaces 14 of the locking slots 11 so that the back stop 12 is freely slidable along the seat 18.

The battery charger 1 also comprises an electronic circuit (not shown) within the body 2.

A Light Emitting Diode (LED) is optionally provided in the front end of the body 2. The LED is connected to the electronic circuit, and indicates that charging is in process and when the battery is fully charged. The charger contacts 8 are also connected to the electronic circuit, the circuit regulating and controlling the voltage and current delivered to the battery 100. The battery charger 1 can charge batteries with either their + terminal or − terminal contacting a particular charger contact 8. The charger contacts 8 do not switch positions since they are slidable in the same groove. Instead, the electronic circuit detects the correct polarity, and automatically switches the charging polarity to suit the battery or battery pack.

An input socket 17 is provided on a side of the body 2. The input socket 2 receives a plug connected to a main power supply, in order to provide electricity to the battery charger 1.

An air intake is provided at the rear end of the body. The air intake is formed of a plurality of apertures in the body, extending along the width of the charger 1.

When the cover 3 rotated into its closed position, an air outlet is disposed at the front end of the charger 1. The air outlet is formed as an aperture between the cover 3 and the body 2, even when the cover 3 is in its closed position.

In use, a battery 100 is placed on the seat 18. The battery 100 is orientated such that its electrical terminals are facing towards the contact blocks 7. The battery is positioned so that its side having electrical terminals 101 touches the charger contacts 8. The contact blocks 7 are then slid until the charger contacts 8 engage with the terminals 101. The locking levers 9 on each contact block are then pushed down to prevent the contact blocks 7 from further sliding.

Figure 1:
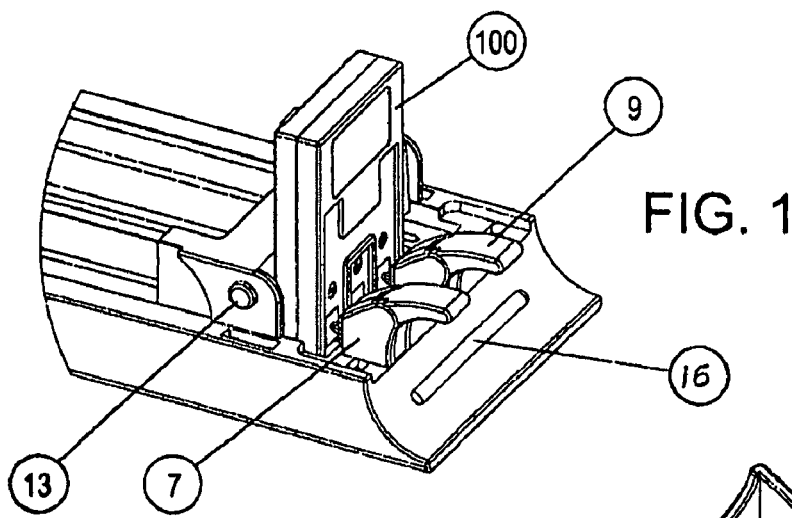
FIG. 1 is a perspective view from a first angle of the battery charger of the present invention, with a first type of battery.

In order to secure the battery 100 in position, the locking buttons 13 are pushed together to disengage the lower part of the locking arms 19 from the restraint surfaces 14. This allows the back stop 12 to be slid forward until the flange 15 contacts the rear side of the battery 100. The locking buttons 13 are then released and the springs 20 urge the locking arms 19 against the restraint surfaces 14, so that the back stop 12 is locked in place. The battery is then securely held between the back stop 12 and contacts 7. The arrangement allows the charging of a battery stood up on its end, as shown in FIG. 1 or flat as shown in FIG. 2. Additionally, the battery 100 may be prevented from moving transversely by contact with the side walls 4.

The battery or battery pack is charged through the electronic circuit and charger contacts 8 until it is fully charged.

Once the battery 100 is fully charged, as indicated by LED 16, the battery is removed from the battery charger 1. This is achieved by urging together the locking buttons 13 to release the locked back stop 12, and allow it to be slid away from the battery. The battery 100 can then be easily removed from the battery charger.

In an alternative embodiment of the invention, a single locking slot is provided extending longitudinally along centre of the seat. Either side of the locking slot, two guidance slots extend longitudinally along the length of the seat. The back stop and a single locking arm engage with the guidance slots and locking slot substantially as described in the preferred embodiment above.

The invention claimed is:

1. A battery charger for charging batteries of different types, the charger comprising:
    a seat for receiving a battery of any type having first and second terminals on one side of the battery, the seat comprising two platforms positioned at different levels;
    first and second electrical contacts, the first and second electrical contacts independently movable relative to the seat and being the sole electrical contacts of the battery charger;
    a back stop moveable relative to the seat for contacting the opposite side of the battery from the first and second electrical contacts, and
    an electronic circuit to supply current via the first and second electrical contacts to the battery to charge the battery,
    wherein each battery to be charged, irrespective of where the first and second terminals are located on each battery, is sandwiched between the back stop and the same first and second electrical contacts with the back stop moved to secure the battery in engagement with the same first and second electrical contacts and the same first and second electrical contacts moved into alignment with the first and second terminals of the battery such that the first and second terminals of every battery type engages the same first and second electrical contacts, respectively.

2. The battery charger of claim 1 wherein the back stop is slidable in a longitudinal slot in the seat.

3. The battery charger of claim 2 wherein the seat is provided with at least one longitudinal guidance slot and the back stop is slidably located in the slot so that the back stop can be slid longitudinally along the seat without rotation of the back stop relative to the seat.

4. The battery charger of claim 1 further comprising a manually operable lock for locking the back stop in a selected position on the seat.

5. The battery charger of claim 4 wherein:
    the seat is provided with at least one locking slot,
    the lock comprises at least one locking arm, the locking arm engageable with a surface of the locking slot.

6. The battery charger of claim 5 further comprising a resilient member, the resilient member urging the locking arm into engagement with a surface of the locking slot.

7. The battery charger of claim 5 wherein the locking slot comprises a serrated surface.

8. The battery charger of claim 7 wherein the serrated surface is on a side of the locking slot.

9. The battery charger of claim 5 wherein there are two locking slots and two locking arms, each locking arm urgeable by a locking button into engagement with one locking slot.

10. The battery charger of claim 5 wherein the locking arm comprises a lower part and an upper part,
    the lower part of the locking arm engageable with the locking slot;
    the upper part of the locking arm moveable by a user to disengage the lower part of the locking arm from the locking slot.

11. The battery charger of claim 1 further comprising a longitudinal flange, the flange extending along an edge of the seat.

12. The battery charger of claim 1 wherein the first and second electrical contacts are slidable in a transverse slot.

13. The battery charger of claim 12 wherein the first and second contacts are each attached to a locking lever, the locking lever engageable with the transverse slot to lock the first and second contacts in position on the seat.

14. The battery charger of claim 12 further comprising a manually operable lock for locking the back stop in selected position on the seat.

15. The battery charger of claim 1 further comprising a manually operable lock for locking the back stop in a selected position on the seat,
    the seat being provided with at least one locking slot extending longitudinally along the seat;
    the lock comprises a pair of locking arms biased by resilient members, the locking arms having lower parts engageable with surfaces of the locking slot under the action of the resilient members.

16. A battery charger for charging batteries of different sizes and types, each battery having a pair of terminals that may be spaced apart differently from every other type of battery, the charger comprising:

a charger body having a battery seat for receiving a battery to be charged;

a single pair of electrical contacts slidably located in a contact slot provided in the charger body adjacent the battery seat, said single pair of electrical contacts being the sole pair of electrical contacts of the battery charger; and a back stop slidable in a back stop slot which extends along the battery seat perpendicular to the contact slot and which has an engagement surface for engaging the battery to be charged, the engagement surface facing the electrical contacts; wherein the electrical contacts can be slid relative to each other along the contact slot to vary spacing between the electrical contacts to accommodate different spacings of the pair of battery terminals such that the pair of terminals of every battery type engage the single, sole pair of electrical contacts and wherein the back stop can be slid to different locations along the back stop slot to accommodate different sizes of battery with each battery sandwiched between the back stop and the electrical contacts and with the back stop securing each battery in engagement with the electrical contacts.

* * * * *